United States Patent [19]

Zielinski

[11] 3,818,104

[45] June 18, 1974

[54] USE OF DITHIOBIURETS AS FUNGICIDES

[75] Inventor: James Zielinski, Kenilworth, N.J.

[73] Assignee: Esso Research and Engineering Company, Linden, N.J.

[22] Filed: Dec. 21, 1970

[21] Appl. No.: 100,365

Related U.S. Application Data

[63] Continuation-in-part of Ser. Nos. 732,858, May 20, 1968, and Ser. No. 821,975, May 5, 1969, abandoned.

[52] U.S. Cl.............. 424/322, 71/99, 71/119, 424/244, 424/248, 424/250, 424/263, 424/267, 424/273, 424/274, 424/285, 424/323
[51] Int. Cl.............................. A01n 9/12
[58] Field of Search...... 424/322; 260/552 R, 553 B

[56] References Cited
UNITED STATES PATENTS

| | | | |
|---|---|---|---|
| 2,658,062 | 11/1953 | Jones | 260/132 |
| 2,704,244 | 3/1955 | Goodhue et al. | 71/99 |
| 3,092,484 | 6/1963 | Salzberg | 71/99 |

OTHER PUBLICATIONS
Jensen et al., Alta Chemica Scandinavich, Vol. 22, (1968), No. 1, pp. 1, 36 & 37.

*Primary Examiner*—Albert T. Meyers
*Assistant Examiner*—Leonard Schenkman

[57] ABSTRACT

Semicarbazides, especially the tetraalkylated thiosemicarbazides, and biuret derivatives, especially the mono- and di-thiobiuret derivatives, are effective fungicides, bactericides, herbicides, and also have demonstrated effective growth regulating activity. Exemplary of preferred semicarbazides are those of the general formula:

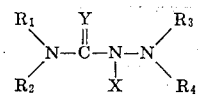

where $R_1$–$R_4$ can be unsubstituted or substituted $C_1$–$C_{14}$ alkyl and X can be hydrogen, or unsubstituted or substituted $C_1$–$C_{14}$ alkyl and Y can be O or S.

Exemplary of preferred biuret derivatives are those of the general formula:

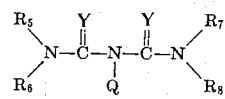

wherein $R_5$–$R_{11}$ can be hydrogen or unsubstituted or substituted $C_1$–$C_{14}$ alkyl and Y can be O or S and combinations thereof; and Q can be $R_9$ or

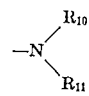

9 Claims, No Drawings

USE OF DITHIOBIURETS AS FUNGICIDES

This application is a continuation-in-part of copending application U.S. Ser. No. 732,858 filed on May 20, 1968 in the name of James Zielinski relating to "Pesticidal Semicarbazide and Biuret Derivatives" and also copending application U.S. Ser. No. 821,975 filed on May 5, 1969, now abandoned in the name of James Zielinski relating to "Semicarbazide and Biuret Derivatives and Their Use as Agricultural Pesticides and Animal Health Agents". This invention relates to the use of tetrasubstituted thiosemicarbazides and substituted biurets as effective fungicides, bactericides, herbicides and also for effective growth regulating activity.

Substituted thiosemicarbazides, or thiocarbamoyl hydrazides as they are also termed, are well known in the literature. For example, the trialkylated species, i.e.,

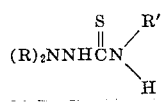

where R is a lower alkyl group such as methyl or ethyl and R' is methyl or t-butyl, is disclosed in British Patent No. 858,995. However, the significance of additional alkylation and the consequent potent fungicidal activity possessed by the tetraalkylated species are not disclosed or suggested by this British patent.

In addition, other thiosemicarbazides are known, as for example, the

compound shown in Volume 59 of *Chem. Abstract*, 13284a; or the compounds of the formula:

where R=4-chloro, 2-6-dichloro, 2,4,5-trichloro, 4-methyl, 4-methoxy, etc. shown in German Patent No. 1,174,103. Also known are thiosemicarbazides of the formula:

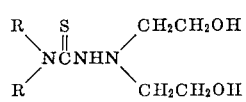

where R is hydrocarbyl.

However, none of the prior art thiosemicarbazides discloses the thiosemicarbazide compounds of this invention or their fungicidal activity.

Relative to the biuret derivatives of this invention, it is to be noted that several substituted dithiobiurets are known. For example, U.S. Pat. No. 3,092,484 discloses compounds of the formula:

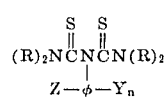

where R is $C_1$ to $C_4$ alkyl, Z is H, $NO_2$ or $C_1$-$C_4$ alkyl, Y is H or halogen, n is 1 to 3, and their use as herbicides. Moreover, German Patent No. 859,150 discloses compounds of the formula

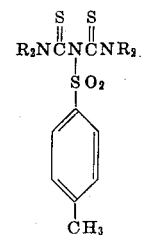

where $R_2$ is $CH_3$ or $C_2H_5$, or cycloalkyl such as penta- or tetramethylene, which compounds are known as vulcanizing accelerators. Disclosed, furthermore, in U.S. Pat. No. 2,704,244 are compounds of the general formula:

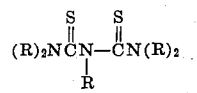

where R is given as hydrocarbyl.

However, unknown to the prior art concerned with biuret derivatives, which art is exemplified by the foregoing patents, are compounds resulting from the substitution of two dialkylthiocarbamoyl moieties on a molecule of an unsymmetrical-substituted hydrazine; unknown as well is the potent fungicidal activity of such compounds.

Semicarbazides, especially the tetraalkylated thiosemicarbazides, and biuret derivatives, especially the mono- and dithiobiuret derivatives, are effective fungicides, bactericides, herbicides, and also have demonstrated effective growth regulating activity. Exemplary of preferred semicarbazides are those of the general formula:

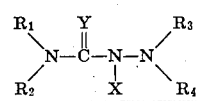

where $R_1$–$R_4$ can be unsubstituted or substituted $C_1$–$C_{14}$ alkyl and X can be hydrogen, or unsubstituted or substituted $C_1$–$C_{14}$ alkyl, and Y can be O or S.

Exemplary of preferred biuret derivatives are those of the general formula:

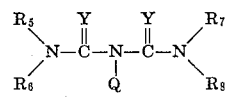

wherein $R_5$–$R_{11}$ can be hydrogen or unsubstituted or substituted $C_1$–$C_{14}$ alkyl and Y can be O or S and combinations thereof; and Q can be $R_9$ or

The semicarbazides and biuret compositions of this invention can be most efficiently prepared by those methods described in a copending application bearing U.S. Ser. No. 87,301, filed on Nov. 5, 1970.

Preferred semicarbazides illustrative of the foregoing general formula include:

1,1,4,4-tetramethylsemicarbazides; 1,1,2,4,4-pentamethylsemicarbazides; 1,1-dimethyl-4,4-diethylsemicarbazides; 1-pentyl-1,4,4-trimethylsemicarbazides; etc. Additional semicarbazides include 1,1,4-trimethyl-4-allyl semicarbazides; 1,1,4,4-tetramethyl-2-dodecylsemicarbazides; 1-cyanoethyl-1,4,4-trimethylsemicarbazides; 1,1,2-trimethyl-4,4-di(2-chloroethyl) semicarbazides; 1,4-dimethyl-1,4-dibenzylsemicarbazides; 1,1,4-trimethyl-2-phenyl-4-propylsemicarbazides; 1,1,2-trimethyl-4,4-pentamethylenesemicarbazides; 1-(4-nitrophenyl)-1-methyl-3-N-morpholino-urea; etc.

The preferred monothio-, dithio- or biuret compounds of this invention illustrative of the foregoing general formula relating to the biuret derivatives include:

1,1-dimethyl-3-diallylamino-5,5-pentamethylene monothiobiuret or dithiobiuret; 1,1,5,5-tetramethyl-3-N-thiomorpholino monothiobiuret or dithiobiuret; 1,5-dimethyl-1,5-diethyl-3-N-methyl-4-chloro-anilino-2-thiobiuret; 1-(2-ethoxyethyl)-1-methyl-3-dipropargylamino-5,5-pentamethylene monothiobiuret or dithiobiuret; 1,1,5,5-tetramethyl-3-dimethylamino monothiobiuret or dithiobiuret; 1,1,5,5-tetramethyl-3-pentamethylene-amino monothiobiuret or dithiobiuret; 1,1,5,5-tetraethyl-3-dimethylamino monothiobiuret or dithiobiuret; 1,1,5,5-tetramethyl-3-diethylamino monothiobiuret or dithiobiuret; 1,1-dimethyl-3-dimethylamino-5,5-diethyl monothiobiuret or dithiobiuret; 1,1,5,5-tetramethyl-3-pentamethyleneamino monothiobiuret or dithiobiuret; 1,1,5,5-tetraethyl-3-hexamethylamino monothiobiuret or dithiobiuret; 1,1,-5,5-tetramethyl-3-hexamethyleneamino monothiobiuret or dithiobiuret; 1,1,5,5-tetramethyl-3-di-n-propylamino monothiobiuret or dithiobiuret; 1,1,5,5-tetraethyl-3-diethylamino dithiobiuret; 1,1,5,5-tetramethyl-3-dimethylamino-2-thiobiuret; 1-dodecyl-1,5,5-trimethyl-3-dimethylamino monothiobiuret or dithiobiuret; 1,1-dimethyl-3-N-methyldodecylamino-5,5-diethyl monothiobiuret or dithiobiuret; etc.

Suitable pentasubstituted dithiobiurets are as follows: 1,1,5,5-tetramethyl-3-isopropyl dithiobiuret; 1,5-diphenyl-1,3,5-trimethyl dithiobiuret; 1,1,3,5-tetraethyl-5-isopropyl dithiobiuret; 1,3,5-tributyl-1,5-di(p-chlorophenyl) dithiobiuret; 1,1,3,5,5-pentamethyl dithiobiuret; 1,1,5,5-tetrapropyl-3-methyl dithiobiuret.

As previously noted, the semicarbazides, biurets, and mono- or dithiobiurets of this invention are useful as pesticides, particularly as fungicides, bactericides, herbicides, and for effective growth regulating activity. When used the biologically active semicarbazides, biurets, and mono or dithiobiurets are preferably formulated with a suitable carrier or diluent or combinations thereof.

In addition, the several semicarbazides, thiosemicarbazides, biurets, mono- and dithiobiurets are useful animal health agents particularly as mammalian and animal fungicides and bactericides (animal pathogens). When used, the biologically active dithiobiurets are preferably formulated with a suitable carrier or diluent or combinations thereof.

The term "carrier" or "diluent" as used herein means a material, which can be inorganic or organic and synthetic or of natural origin, with which the active semicarbazides and mono- or dithiobiurets are mixed or formulated to facilitate its storage, transport, and handling and application of the plants or fungi to be treated. The carrier is preferably biologically and chemically inert and, as used, can be a solid or fluid. When solid carriers are used, they are preferably particulate; however, other shapes and sizes of solid carrier can be employed as well. Such preferable solid carriers can be natural occurring minerals — although subsequently subjected to grinding, sieving, purification, and/or other treatments — including, for example, gypsum; tripolite diatomaceous earth; mineral silicates such as mica, vermiculite, talc, and pyrophyllite, clays of the montmorillonite, kaolinite, or attapulgite groups; calcium or magnesium limes, or calcite and dolomite; etc. Carriers produced synthetically, as for example, synthetic hydrated silica oxides and synthetic calcium silicates can also be used, and many proprietary products of this type are available commercially. The carrier can also be an elemental substance such as sulfur or carbon, preferably an activated carbon.

Fluid carriers can be liquids, as for example, water, or an organic fluid, including a liquefied normally vaporous or gaseous material, or a vaporous or gaseous material, and can be solvents or nonsolvents for the active material. For example, the horticultural petroleum spray oils boiling in the range of from about 275° to about 575°F., or boiling in the range of about 575°F. to about 1000°F. and having an unsulfonatable residue of at least about 75% and preferably of at least about 90%, or mixtures of these two types of oil, are particularly suitable liquid carriers.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 90% by weight of the active thiosemicarbazide and mono- or dithiobiuret ingredient, preferably from about 20 to about 80 wt. %. These concentrates can be diluted with the same or different carrier to a concentration suitable for application. The compositions of this invention may also be dilute compositions suitable for application. In general, concentrations of about 0.1 to about 10% by weight of active material based on the total weight of the composition are satisfactory, although lower and higher concentrations can be applied if necessary.

The compositions of this invention can also be formulated as dusts. These comprise an intimate admixture of the active thiosemicarbazide and mono- or dithiobiuret ingredients and a finely powdered solid carrier such as aforedescribed. The powdered carriers can be oil-treated to improve adhesion to the surface to which they are applied. These dusts can be concentrates, in which case a highly sorptive carrier is preferably used. These require dilution with the same or a different finely powdered carrier, which can be of lower soprtive capacity, to a concentration suitable for application.

The compositions of the invention can be formulated as wettable powders comprising a major proportion of the thiosemicarbazides, biurets, and mono- or thiobiurets mixed with a dispersing, i.e., deflocculating or suspending, agent, and if desired, a finely divided solid carrier and/or a wetting agent. The thiosemicarbazides, biurets, and mono- or dithiobiurets can be in particulate form or adsorbed on the carrier and preferably constitute at least about 10%, more preferably at least about 25%, by weight of the composition. The concentration of the dispersing agent should in general be between about 0.5 and about 5% by weight of the total composition, although larger or smaller amounts can be used if desired.

The dispersing agent used in the composition of this invention can be any substance having definite dispersing, i.e., deflocculating or suspending properties, as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferably, however, the dispersants or dispersing agents used are sodium or calcium salts of high molecular weight sulfonic acids, as for example, the sodium or calcium salts of lignin sulfonic acids derived from sulfite cellulose waste liquors. The calcium or sodium salts of condensed aryl sulfonic acid, for example, the products known as "Tamol 731", are also suitable.

The wetting agents used can be nonionic type surfactants, as for example, the condensation products of fatty acids containing at least 12, preferably 16 to 20, carbon atoms in the molecule, or abietic acid or napthenic acid obtained in the refining of petroleum lubricating oil fractions with alkylene oxides such as ethylene oxide or propylene oxide, or with both ethylene oxide and propylene oxide, as for example, the condensation product of oleic acid and ethylene oxide containing about 6 to 15 ethylene oxide units in the molecule. Other nonionic wetting agents like polyalkylene oxide polymers, commercially known as "Pluronics" can be used. Partial esters of the above acids with polyhydric alcohols such as glycerol, polyglycerol, sorbitol, or mannitol can also be used.

Suitable anionic wetting agents include the alkali metal salts, preferably sodium salts, of sulfuric acid esters or sulfonic acids containing at least 10 carbon atoms in a molecule, for example, the sodium secondary alkyl sulfates, dialkyl sodium sulfosuccinate available under the registered trademark "Teepol", sodium salts of sulfonated castor oil, sodium dodecyl benzene sulfonate.

The final wettable powder should preferably have an average particle size of 5–10.

Where the toxicant itself is a liquid, these materials can be sprayed on crops or fungi without further dilution.

Petroleum hydrocarbon fractions used as solvents should preferably have a flash point above 73°F., an example of this being a refined aromatic extract of kerosene. Auxiliary solvents such as alcohols, ketones, and polyalkylene glycol ethers and esters can be used in conjunction with these petroleum solvents.

The present invention is further illustrated in greater detail by the following examples, but it is to be understood that the present invention in its broadest aspects, is not necessarily limited in terms of the reactants, or specific temperatures, residence times, separation techniques, and other process conditions; or dosage levels, exposure times, etc., by which the compounds and/or compositions described and claimed are prepared and/or used.

The broad spectrum of fungicidal and bactericidal activity demonstrated by the semicarbazides, thiosemicarbazides, biurets, and mono- and dithiobiurets of this invention allows the conclusion to be drawn that all of the described chemicals possess significant animal and mammalian fungitoxic and bactericidal activity.

The semicarbazides, thiosemicarbazides, biurets, mono- and dithiobiurets of this invention also exhibit growth regulant activity. A variety of plant growth alterations have been observed.

EXAMPLE 1 — Preparation of 1,1,2,4,4-Pentamethyl Thiosemicarbazide

A solution of 11.5 g. (0.09 mole) of dimethylthiocarbamoyl chloride in 50 ml. of tetrahydrofuran was added dropwise to a stirred solution of 13.8 g. (0.18 mole) of trimethylhydrazine in 50 ml. of tetrahydrofuran. The slightly cloudy solution was refluxed for 7 hours and stirred at room temperature overnight. The reaction mixture consisted of two layers. The upper (tetrahydrofuran) layer was evaporated in vacuo and the resulting oil was partitioned between $H_2O$ and chloroform. The chloroform layer was dried over $MgSO_4$, filtered and evaporated in vacuo to yield a clear brown liquid which was vacuum distilled to yield 1,1,2,4,4-pentamethyl thiosemicarbazide, bp. 57°–67°C. at 0.25 mm.

EXAMPLE 2 — Preparation of 1,1,4,4-Tetramethyl Semicarbazide

Dimethylcarbamoyl chloride (89.2 g., 0.83 mole) was added dropwise to stirred solution of 50 g. (0.83 mole) of 1,1-dimethyl hydrazine and 83.7 g. (0.83 mole) of triethylamine in 200 ml. of tetrahydrofuran. After the initial exothermic reaction the mixture was refluxed for 4 hours, filtered and the solvent removed in vacuo. The resulting solid was crystallized from hexane to yield 62.9 g. of 1,1,4,4-tetramethyl semicarbazide (58%) m.p. 75°–79°C.

| Elemental Analysis: | | |
|---|---|---|
| Calculated for $C_5H_{13}N_3O$: | C, 46.0; | N, 32.2 |
| Found: | C, 45.75; | N, 30.74. |

To form a biuret from 1,1,4,4-tetramethyl semicarbazide, 1,1,4,4-tetramethyl semicarbazide could be reacted with dimethylcarbamoyl chloride in the presence of a strong base with acetonitrile as the solvent to give 1,1,5,5-tetramethyl-3-dimethylamino biuret in accordance with the following equation:

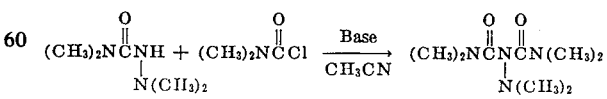

EXAMPLE 3 — Preparation of 1,1,4,4-Tetramethyl Thiosemicarbazide

A solution of 1 g. (0.6 mmole) of methyl-N,N-dimethyl hydrazino dithiocarbamate in 25 ml. of acetone was combined with an excess of dimethylamine (40% of solution in water) in a pressure bottle. The bottle was sealed and heated on a steam bath for 45 minutes. The reaction was allowed to cool and the contents of the bottle were evaporated in vacuo. The resulting solid was recrystallized from acetone to yield a white solid, 1,1,4,4-tetramethyl thiosemicarbazides, m.p. 93°C.

Elemental Analysis:

| | | | | |
|---|---|---|---|---|
| Calculated for $C_5H_{13}N_3S$: | C, 40.78; | H, 8.89; | N, 28.54; | S, 21.78 |
| Found: | C, 41.11; | H, 8.84; | N, 27.69; | S, 21.64. |

EXAMPLE 4 — Preparation of 1,1,5,5-Tetramethyl-3-Dimethylaminodithiobiuret

To a stirred solution of 135 g. (2.25 mole) of unsymmetrical dimethylhydrazine in 400 ml of water was added in portions 92.7 g. (0.75 mole) of solid dimethylthiocarbamoyl chloride. The temperature rose to 32°C. and as the addition progressed a yellow solid deposited. When the addition was complete the temperature remained at 32°C. for one hour and the suspension was allowed to stir for an additional 48 hours. The mixture was filtered and the yellow solid was washed with water. The solid was allowed to air dry to yield 54.7 g. (61.5%) of the dithiobiuret. A sample was recrystallized from ethanol three times to yield a white solid which turned pale yellow on exposure to air, m.p. 107°-107.5°C.

Elemental Analysis:

| | | | | |
|---|---|---|---|---|
| Calculated for $C_8H_{18}N_4S_2$: | C, 40.99; | H, 7.74; | N, 23.90; | S, 27.36 |
| Found: | C, 40.66; | H, 7.58; | N, 23.63; | S, 27.75. |

The mother liquor was treated as follows which is an example of the preparation of thiosemicarbazides by this method. This is a further example of Method 1.

The aqueous mother liquor resulting from the filtration and washing of the dithiobiuret analog was extracted several times with chloroform. The organic layers were combined, dried (MgSO$_4$), filtered and evaporated in vacuo to yield 28.6 g. of 1,1,4,4-tetramethyl thiosemicarbazide as a brown solid. A sample was recrystallized from acetone to yield glistening white needles, m.p. 92°-93°C. No depression of the melting point was observed when this material was combined with the product described under Method 2.

EXAMPLE 5 — Preparation of 1,1-Dimethyl-5,5-Diethyl-3-Dimethylamino Dithiobiuret A solution of 14.7 grams (0.1 mole) of 1,1,4,4-tetramethyl thiosemicarbazide; 15.2 grams (0.1 mole) of diethylthiocarbamoyl chloride; 11.2 grams (0.1 mole) of triethylenediamine (1,4-diaza bicyclo 2,2,2-octane) in 50 ml of acetonitrile was allowed to stir overnight at room temperature. The reaction mixture was filtered and the acetonitrile solution was cooled to yield 13.6 grams (52%) of the dithiobiuret as pale yellow crystals m.p. 105°-106.5°C.

Elemental Analysis:

| | | | | |
|---|---|---|---|---|
| Calculated for $C_{10}H_{22}N_4S_2$: | C, 45.7; | H, 8.38; | N, 21.37; | S, 24.43 |
| Found: | C, 45.9; | H, 8.20; | N, 21.33; | S, 23.90. |

EXAMPLE 6 — Preparation of 1,1,5,5-Tetramethyl-3-Dimethylamino-2-Thiobiuret

A solution of 14.7 grams (0.1 mole) 1,1,4,4-tetramethyl thiosemicarbazide, 10.8 grams (0.1 mole) of dimethylcarbamoyl chloride and 11.2 grams (0.1 mole) of triethylenediamine (1,4-diaza-bicyclo 2,2,2-octane) in 150 ml of acetonitrile was allowed to stir for 48 hours. The resulting suspension was filtered and the acetonitrile solution was evaporated in vacuo to yield a pink liquid which solidified on standing. This material was recrystallized from ether to yield 9.8 grams (45%) of the 2-thiobiuret as tan crystals, m.p. 56°-57°C.

Elemental Analysis:

| | | | |
|---|---|---|---|
| Calculated for $C_8H_{18}N_4OS$: | C, 44.0; | H, 8.25; | N, 25.61 |
| Found: | C, 44.08; | H, 8.59; | N, 25.58. |

EXAMPLE 7

Included herebelow in Table I are a number of thiosemicarbazides prepared in accordance with Methods 1 or 2 of this invention.

TABLE I

| Compound | Structure | Name | B.P. or M.P., °C. |
|---|---|---|---|
| 1 | (CH$_3$)$_2$NC(=S)NHN(CH$_3$)$_2$ | 1,1,4,4-tetramethyl thiosemicarbazide | 93°. |
| 2 | (CH$_3$)$_2$NC(=S)N(CH$_3$)—N(CH$_3$)$_2$ | 1,1,2,4,4-pentamethyl thiosemicarbazide | B.P. 57–67° at 0.25 mm. |
| 3 | (C$_2$H$_5$)$_2$NC(=S)NHN(CH$_3$)$_2$ | 1,1-dimethyl-4,4-diethyl thiosemicarbazide | 77–79°. |
| 4 | (CH$_3$)$_2$NC(=S)NHN(φ)(CH$_3$) | 1-phenyl-1,4,4-trimethyl thiosemicarbazide | 155–157°. |
| 5 | (CH$_3$)$_2$NC(=S)NHN(CH$_3$)((CH$_2$)$_{11}$CH$_3$) | 1-n-dodecyl-1,4,4-trimethyl thiosemicarbazide | 40–42°. |
| 6 | (CH$_3$CH$_2$CH$_2$)$_2$NC(=S)NHN(CH$_3$)$_2$ | 1,1-dimethyl-4,4-di-n-propyl thiosemicarbazide | 60–60.5°. |
| 7 | [CH$_3$(CH$_2$)$_5$]$_2$NC(=S)NHN(CH$_3$)$_2$ | 1,1-dimethyl-4,4-di-n-hexyl thiosemicarbazide | Clear oil. |
| 8 | (CH$_3$)$_2$NC(=S)N(N(CH$_3$)$_2$)C(=S)N(CH$_3$)$_2$ | 1,1,5,5-tetramethyl-3-dimethylaminodithiobiuret | 107–107.5°. |
| 9 | (CH$_3$)$_2$NC(=S)N(piperidino)C(=S)N(CH$_3$)$_2$ | 1,1,5,5-tetramethyl-3-pentamethyleneamino dithiobiuret | 124–125°. |
| 10 | (C$_2$H$_5$)$_2$NC(=S)N(N(CH$_3$)$_2$)C(=S)N(C$_2$H$_5$)$_2$ | 1,1,5,5-tetraethyl-3-dimethylamino dithiobiuret | 90–91°. |
| 11 | (CH$_3$)$_2$NC(=S)N(N(C$_2$H$_5$)$_2$)C(=S)N(CH$_3$)$_2$ | 1,1,5,5-tetramethyl-3-diethylamino dithiobiuret | 66–67.5°. |
| 12 | (CH$_3$)$_2$NC(=S)N(N(CH$_3$)$_2$)C(=S)N(C$_2$H$_5$)$_2$ | 1,1-dimethyl-3-dimethylamino-5,5-diethyl dithiobiuret | 105–106.5°. |
| 13 | (C$_2$H$_5$)$_2$NC(=S)N(piperidino)C(=S)N(C$_2$H$_5$)$_2$ | 1,1,5,5-tetraethyl-3-pentamethyleneamino dithiobiuret | 63–64.5°. |
| 14 | (C$_2$H$_5$)$_2$NC(=S)N(hexamethyleneamino)C(=S)N(C$_2$H$_5$)$_2$ | 1,1,5,5-tetraethyl-3-hexamethyleneamino dithiobiuret | 66.5–68°. |
| 15 | (CH$_3$)$_2$NC(=S)N(hexamethyleneamino)C(=S)N(CH$_3$)$_2$ | 1,1,5,5-tetramethyl-3-hexamethyleneamino dithiobiuret | 115–116°. |
| 16 | (CH$_3$)$_2$NC(=S)N(N(CH$_3$)$_2$)C(=O)N(CH$_3$)$_2$ | 1,1,5,5-tetramethyl-3-dimethylamino monothiobiuret | 56–57°. |

TABLE 1—Continued

| Compound | Name | B.P. or M.P., °C. |
|---|---|---|
| 17 | 1,1,5,5-tetramethyl-3-carbethoxyamino dithiobiuret | 128–129°. |
| 18 | 1,1,5,5-tetramethyl-3-di-n-propylamino dithiobiuret. | 103–106°. |
| 19 | 1,1,5,5-tetraethyl-3-diethylamino dithiobiuret | 101–103°. |
| 20 | 1,1-dimethyl-3-dimethylamino-5,5-di-n-propyl dithiobiuret. | 78–79°. |
| 21 | 1,1,5,5-tetramethyl-3(N-methyl dodecylamino) dithiobiuret. | 51°. |
| 22 | 1,1-dimethyl-4,4-pentamethylene thiosemicarbazide. | 69–70°. |
| 23 | 1,1,4-trimethyl-4-n-dodecyl thiosemicarbazide | 39.5–40.5°. |
| 24 | 1,1-dimethyl-4,4 (3-oxotetramethylene) thiosemicarbazide. | 117.5–118.8°. |
| 25 | 1,1-dimethyl-4,4 [(N-methyl)-3-amino tetramethylene] thiosemicarbazide. | 90–91.5°. |
| 26 | 1,1-dimethyl-4-ethyl-4-cyclohexyl thiosemicarbazide. | 81.5–83°. |
| 27 | 2,4,4-trimethyl thiosemicarbazide | 61.8–63°. |
| 28 | 1(3,4-dichlorophenyl carbamoyl)-2,4,4-trimethyl thiosemicarbazide. | 178.5–179.5°. |
| 29 | 1,1-dimethyl-3-N-cyclohexane carboximido thiourea. | 228–231°. |
| 30 | 1,1-dimethyl 3-N norbornene 4,5-dicarboxylic acid imide) thiourea. | 255–256. |
| 31 | 1,1-dimethyl-3-N homopiperdino thiourea | 62–63°. |

TABLE 1—Continued

| Compound | Structure | Name | B.P. or M.P., °C. |
|---|---|---|---|
| 32 | (CH₃)₂N—C(=S)—N(H)—N(CH₂)₅ | 1,1-dimethyl-3-N-piperidino thiourea | 84–86°. |
| 33 | (CH₃)₂N—C(=S)—N(H)—N(CH₃)-(6-chloro-2-pyridyl) | 1,4,4-trimethyl-1-(6-chloro-2-pyridyl)thiosemicarbazide | 118.5–121°. |
| 34 | (CH₃)₂N—C(=S)—NH—N(CH₃)(φ) | 1,4,4-trimethyl-1-phenyl-thiosemicarbazide | 159.5–161°. |
| 35 | (CH₃)₂N—C(=S)—N[N(CH₃)₂]—C(=S)—N[(CH₂)₅CH₃]₂ | 1,1-dimethyl-3-dimethylamino 5,5-di-n-hexyl dithiobiuret | Oil. |
| 36 | (CH₃)₂N—C(=S)—N[N(CH₃)₂]—C(=S)—N(pentamethylene-S) | 1,1-dimethyl-3-dimethylamino 5,5-pentamethylene dithiobiuret | 95–96.5°. |
| 37 | (CH₃)₂N—C(=S)—N[N(CH₃)(phenyl)]—C(=S)—N(CH₃)₂ | 1,1,5,5-tetramethyl-3-(N-methyl anilino) dithiobiuret | 157–160°. |
| 38 | (CH₃)₂N—C(=S)—N[N(CH₃)₂]—C(=S)—N(CH₃)[(CH₂)₁₁CH₃] | 1,1,5-trimethyl-3-dimethylamino-5-n-dodecyl dithiobiuret | 28–30°. |
| 39 | (CH₃)₂N—C(=S)—N[N(CH₃)₂]—C(=S)—N(3-oxotetramethylene) | 1,1-dimethyl-3-dimethylamino 5,5-(3-oxotetramethylene) dithiobiuret | 125.5–126.5°. |
| 40 | (3-oxotetramethylene)N—C(=S)—N[N(CH₃)₂]—C(=S)—N(3-oxotetramethylene) | 1,1,5,5-di(3-oxotetramethylene) dimethylamino dithiobiuret | 208–210°. |
| 41 | (pentamethylene-S)N—C(=S)—N[N(CH₃)₂]—C(=S)—N(3-oxotetramethylene) | 1,1-pentamethylene-3-dimethylamino 5,5-(3-oxotetramethylene) dithiobiuret | 164.5–165.5°. |
| 42 | (pentamethylene-S)N—C(=S)—N[N(CH₃)₂]—C(=S)—N(pentamethylene-S) | 1,5,5-di(pentamethylene)-3-dimethylamino dithiobiuret | 138.5–139.5°. |
| 43 | (CH₃)₂N—C(=S)—N[N(CH₃)₂]—C(=S)—N(CH₃)(phenyl) | 1,1,5-trimethyl-3-dimethylamino 5-phenyl dithiobiuret | Oil. |
| 44 | (CH₃)₂N—C(=S)—N[N(CH₃)₂]—C(=S)—N[(N-methyl)-3-amino tetramethylene] | 1,1-dimethyl-3-dimethylamino 5,5-[(N-methyl)-3-amino tetramethylene] dithiobiuret | 103.5–104.5°. |
| 45 | (CH₃)₂N—C(=S)—N[N(CH₃)₂]—C(=S)—N[(NN-dimethyl)-3-amino tetramethylene]⁺ I⁻ | 1,1-dimethyl-3-dimethyl amino 5,5-[(NN dimethyl)-3-amino tetramethylene] iodide | 188–190°. |
| 46 | (CH₃)₂N—C(=S)—N[CH₃, CH₂CH₂CN]—C(=S)—N(CH₃)₂ | 1,1,5,5-tetramethyl 3[N methyl(2-cyanoethyl) amino] dithiobiuret | 101–103.5°. |
| 47 | (CH₃)₂N—C(=S)—N[N(CH₃)₂]—C(=S)—N(C₂H₅)(cyclohexyl-S) | 1,1-dimethyl-3-dimethylamino-5-ethyl-5-cyclohexyl dithiobiuret | 122–123.5°. |

TABLE 1—Continued

| Compound | Name | B.P. or M.P., °C |
|---|---|---|
| 48 | 1,1-dimethyl-3-dimethylamino-5-[(3-N methyl)-3-ammotetramethylene) dithiobiuret hydrochloride. | Gum. |
| 49 | 1,1-dimethyl 2(imidazolyl thiocarbamoyl)4,4-dimethyl thiosemicarbazide. | |
| 50 | 1,1-dimethyl-3-dimethylamino 5-ethyl-5-(1-naphthyl)dithiobiuret. | 139–142°. |
| 51 | 1,1,5,5-tetra-n-propyl-3-dimethylamino dithiobiuret. | 42–43°. |
| 52 | 1-methyl-1-phenyl-3-dimethylamino 5-ethyl-5-cyclohexyl-dithiobiuret. | 105–109°. |
| 53 | 1,1-dimethyl-3-dimethylamino 5-ethyl-5-phenyl dithiobiuret. | 79–82°. |
| 54 | 1,1-dimethyl-3-dimethylamino-5-methyl-5-(4-chlorophenyl) dithiobiuret. | Oil. |
| 55 | 1,1-dimethyl-3-dimethylamino-5-ethyl-5-(4-methylphenyl) dithiobiuret. | Oil. |
| 56 | 1,1-dimethyl-3-dimethylamino 5-methyl-5(4 methylthiophenyl) dithiobiuret. | Oil. |
| 57 | 1,5-dimethyl-1,5-diphenyl-3-dimethylamino dithiobiuret. | 145–147.5°. |
| 58 | 1,1,5-trimethyl-3-dimethylamino-5-benzyl dithiobiuret. | Oil. |
| 59 | 1,1,5-trimethyl-3-hexamethylene amino-5-phenyl dithiobiuret. | 133–134°. |
| 60 | 1,1,5-trimethyl-3-pentamethylene amino-5-phenyl dithiobiuret. | 132–135°. |
| 61 | 1,1,5,5-tetramethyl-3[N-methyl(6-chloropyridyl)-amino] dithiobiuret. | 156–158°. |

TABLE 1—Continued

| Compound | Structure | Name | B.P. or M.P., °C. |
|---|---|---|---|
| 62 | (CH₃)₂N–C(=S)–N–C(=S)–N(CH₂CH₂CH₃)(phenyl with N(CH₃)₂) | 1,1-dimethyl-3-dimethylamino 5-n-propyl-5-phenyl dithiobiuret. | 93–95°. |
| 63 | (CH₃)₂N–C(=S)–N–C(=S)–N(indoline); N(CH₃)₂ | | 114.5–117°. |
| 64 | CH₃N(piperazine)–C(=S)–N–C(=S)–N(CH₃)(phenyl with N(CH₃)₂) | 1,1-[(N-methyl)-3 amino tetramethylene]-3-dimethyl amino-5-methyl-5-phenyl dithiobiuret. | Oil. |
| 65 | CH₃(phenyl)N–C(=S)–N–C(=S)–N(piperidinium)⁺(CH₃)₂ I⁻; N(CH₃)₂ | | Gum. |
| 66 | CH₃(phenyl)N–C(=S)–N–C(=S)–N(CH₃)(phenyl); N–CH₃ | 1,5-dimethyl-1,5-diphenyl-3-N methylanilino dithiobiuret. | 126.5–129°. |
| 67 | (CH₃)₂N–C(=S)–N–C(=S)–N(CH₂CN)₂; N(CH₃)₂ | 1,1-dimethyl-3-dimethylamino 5,5 di(cyanomethyl) dithiobiuret. | |
| 68 | (CH₃)₂N–C(=S)–N–C(=S)–N(phenyl)(CH₂C=O OC₂H₅); N(CH₃)₂ | 1,1-dimethyl-3-dimethylamino 5-phenyl-5-carboethoxymethylene dithiobiuret. | |
| 69 | (CH₃)₂N–C(=S)–N–C(=S)–N(CH₃)(CH₂-furyl); N(CH₃)₂ | 1,1-dimethyl-3-dimethylamino 5-yl-5-furfuryl dithiobiuret. | |
| 70 | (CH₃)₂N–C(=S)–N–C(=S)–N(phenyl)(CH₂-phenyl); N(CH₃)₂ | 1,1-dimethyl-3-dimethylamino-5-phenyl-5-benzyl dithiobiuret. | |
| 71 | (CH₃)₂N–C(=S)–N–C(=S)–N(CH₃)(CH₂-2-pyridyl); N(CH₃)₂ | 1,1,5-trimethyl-3-dimethyl amino-5-(2-picolyl) dithiobiuret. | |
| 72 | (CH₃)₂N–C(=S)–N–C(=S)–N(CH₃)(CH₂-tetrahydrofuryl); N(CH₃)₂ | 1,1,5-trimethyl-3-dimethyl amino 5-tetrahydrofurfuryl dithiobiuret. | |
| 73 | (CH₃)₂N–C(=S)–N–C(=S)–N(phenyl)(NH–C(=O)–C₂H₅); N(CH₃)₂ | 1,1-dimethyl-3-dimethylamino 5-phenyl-5-N-acetamido dithiobiuret. | |
| 74 | (CH₃)₂N–C(=S)–N–C(=S)–N(CH₃)(C=O)(NH); N(CH₃)₂ | | |

EXAMPLE 8 — Preparation of 1,1,5,5-Tetramethyl-3-Isopropyl Dithiobiuret 1,1-Dimethyl-3-isopropyl thiourea (12.2 g, 0.08 mole), dimethyl thiocarbamoylchloride (10.3 g, 0.08 mole) and DABCO (9.5 g, 0.08 mole) were combined in 200 ml acetonitrile and allowed to stir at room temperature for 48 hours. The suspension was filtered and the acetonitrile removed in vacuo to yield a yellow oil which was dissolved in chloroform and washed with 5% HCl and water, dried ($MgSO_4$), filtered and evaporated in vacuo to give a yellow oil. Distillation of the oil gave the title compound as a yellow oil 130°–139° at 0.2 mm. The oil solidified and was recrystallized from ethanol, m.p. 65°–66.5°.

Elemental Analysis:

| | | | | |
|---|---|---|---|---|
| Calculated for $C_9H_{19}N_3S_2$: | C, 46.31; | H, 8.21; | N, 18.00; | S, 27.48 |
| Found: | C, 46.60; | H, 8.35; | N, 17.84; | S, 27.89. |

EXAMPLE 9

Other pentasubstituted dithiobiurets prepared according to Example 8 are as follows:

*lagenarium* (anthracnose), and *Cercospera beticola* (leaf spot); and (5) the Schizomycetes fungi, e.g. against such species as the *Pseudomonas phaseolicola*, *Staphylococcus aureus*, *Escheria coli*, and *Xanthomonas phaseoli* species.

The aforementioned several thiosemicarbazide and monothio- and dithiobiuret compounds of this invention as well as other such compounds have demonstrated their anti-fungal activity both as systemic and topically applied material. These compounds have also controlled cultures of several fungi and bacteria on agar plates. The topically (foliar) applied materials have exerted their control at concentrations of 1000 ppm and lower, whereas soil systemic activity has been demonstrated at concentrations of 50 lbs. per acre and lower. The test formulations actually applied to the plant were prepared in accordance with the following procedure: For example, a suggestive description is as follows:

TABLE II

| Compound | Structure | M.P./B.P. | Yield, percent | Calculated C | H | N | S | Found C | H | N | S |
|---|---|---|---|---|---|---|---|---|---|---|---|
| 75 | $(CH_3)_2N\overset{S}{\underset{\|}{C}}N\overset{S}{C}N(CH_3)_2$, $CH_3$ | 149–152° at 0.3 min | 92 | 40.94 | 7.36 | 20.46 | 31.23 | 41.21 | 7.08 | 20.26 | 31.04 |
| 76 | $(nC_3H_7)_2N\overset{S}{C}N\overset{S}{C}N(nC_3H_7)_2$, $CH_3$ | 42–43° | 85 | 56.73 | 9.84 | 13.23 | 20.20 | 57.18 | 8.45 | 13.56 | 20.63 |
| 77 | $(nC_3H_7)_2N\overset{S}{C}N\overset{S}{C}N(CH_3)_2$, $CH_3$ | 158–160° at 0.15 min | 45 | 50.53 | 8.86 | 16.07 | 24.53 | 51.29 | 8.00 | 16.34 | 23.18 |
| 78 | $\phi\,\overset{S}{C}N\overset{S}{C}N(CH_3)_2$, $CH_3\ CH_3$ | 99–102° | 35 | 53.80 | 6.41 | 15.71 | 23.98 | 53.91 | 6.13 | 15.70 | 23.26 |
| 79 | $(CH_3)_2N\overset{S}{C}N\overset{S}{C}N(CH_3)_2$, $CH(CH_3)_2$ | 65–66.5° | 39 | 46.31 | 8.21 | 18.00 | 27.45 | 46.60 | 8.35 | 17.84 | 27.89 |

EXAMPLE 10

To illustrate their special utility as pesticides especially as fungicides and bactericides, a number of the compounds previously described above were tested with respect to their aforesaid fungicidal and bactericidal activity against (1) the Ascomycetes fungi, e.g. against such species as the *Venturia inequalis* (Apple Scab); *Erysiphe polygoni* (Powdery Mildew), and *Endothia parasitica* species; (2) the Phycomycetes fungi e.g. *Phytophthora infestans* (Late Blight); (3) the Basidiomycetes fungi, e.g. *Uromyces phaseoli*; (4) the Fungi Imperfecti fungi, e.g. against such species as the *Alternaria solani* (early blight), *Colletotrichum* follows:

Aqueous dilutions of the active compounds were prepared by mixing the active ingredients with varying amounts of acetone as an auxiliary solvent, adding thereto 100 ppm % by weight a commercial wetting agent consisting of Triton X-100 and diluting this premixture with at least water to the desired concentration indicated in the following tests. Triton X-100 is one of a line of commercial surfactants produced by Rohm & Haas Company and is a liquid alkyl aryl polyether alcohol that is an acid stable detergent and is non-ionic in character as an emulsifier. It is prepared by reaction of an alkyl phenol with ethylene oxide.

The tests were carried out as follows:

1. Against Ascomycetes i. Against the species *Venturia inequalis:*

A spray solution containing the active fungicide was applied as a protectant spray and as an eradicant spray (24 hours after inoculation with the spores) to apple seedlings.

The following results were obtained.

| 0 = no control | | 10 = complete control | |
|---|---|---|---|
| Compound According to Example No. 7, Table I | Concentration ppm | Protectant | Eradicant |
| 8 | 1000 | 10 | 10 |
| Cyprex* | 1000 | 10 | 9 |

* Cyprex is n-dodecylguanidine acetate.

ii. Against the species *Erysiphe polygoni:*

Step 1:

Bean plants with fully expanded primary leaves were inoculated with spores of the powdery mildew fungus (*Erysiphe polygoni*) prior to application of test chemicals. The bean plants were placed on a revolving table and sprayed with a formulation containing 500 ppm of the test chemical. After the spray had dried, the plants were removed to the greenhouse and held for a period of 7–10 days at the end of which time the amount of mildew on the primary leaves was rated. Ratings were on a scale of 0–10, with 0=no control and 10 = 100% control. Ratings of 8–10 in the primary tests justified taking the chemical to the next step.

Step 2:

The same test as was followed in Step 1 was repeated for this step except that the minimum effect dose was determined in the dilution series of 100, 20, 4 ppm. The standard for this test was Karathane (2-(1-methyl-n-heptyl)-4-6-dinitrophenyl crotonate). Typical values for Karathane:

| ppm | Control Rating |
|---|---|
| 100 | 10 |
| 20 | 8 |
| 4 | 6 |

The following results were obtained:

| Compound according to Example No.7, Table I | ppm | Rating (0–10) |
|---|---|---|
| 8 | 500 | 10 |
| 9 | 500 | 10 |
| 18 | 200 | 9 | iii. Against the species *Endothia parasitica* (Chestnut Blight)

The spores of the Endothia parasitica organism were introduced into potato dextrose agar which contained the test chemical at a concentration of 1,000 ppm. The results were read as a function of the zone of inhibition around the growing spores. Thus, if there was no growth or fungus around each spore, this was interpreted as 100% control. However, if the growth was luxuriant compared to an untreated culture, inhibition in this regard was interpreted as 0%. The following results were obtained.

| Compound according to Example No. 7, Table I | ppm | Rating (0–10) |
|---|---|---|
| 8 | 1000 | 10 |
| hexachlorophene | 1000 | 10 |

2. Against Phycomycetes i. Against the species *Phytophthora infestans* * (Late Blight) Foliar application The test procedure followed here was the same as described in (1)(i), except that the concentration of test chemical used was 1000 ppm.

The following results were obtained.

TABLE III

| Compound according to Example No. 7, Table I | ppm | Rating (0–10) |
|---|---|---|
| 8 | 500 | 10 |
| 9 | 500 | 10 |
| 10 | 500 | 10 |
| 11 | 500 | 10 |
| 1 | 500 | 6 |
| 2 | 500 | 10 |
| Maneb (manganese ethylenebisdithiocarbamate) | 500 | 10 |

*Average of Several Tests

TABLE IV

| Compound According to Example No. 9, Table II | ppm | Rating (0–10) |
|---|---|---|
| 75 | 100 | 8 |
| 76 | 100 | 8 |
| 77 | 100 | 8 |
| 78 | 100 | 6 |
| 79 | 100 | 9 | ii. Against the species *Phytophthora infestans* — Systemic Application

The test compound was applied at a rate of 50 lbs. per acre to soils surrounding tomato plants which were growing in three and one-half inch pots. The plants were 4 weeks old. They were allowed to stand for 3 days in the greenhouse and then inoculated with spores of *Phytophthora infestans*. The number of spots observed were related to those observed in a control plant i.e. a tomato plant and the percent control was based on the growth on the test plant compared with the growth on the standard or control plant.

The following results were obtained.

| Compound according to Example No. 7, Table I | lbs./Acre | Rating (0–10) |
|---|---|---|
| 8 | 50 | 10 |

3. Against the Basidiomycetes fungi
   i. Against the species *Uromyces phaseoli* (bean rust) Foliar application
   Step 1:

Pinto bean plants with fully expanded primary leaves were inoculated with spores of the bean rust fungus (*Uromyces phaseoli*) and incubated for 24 hours. The test chemicals were then applied at a concentration of 500 ppm using the same method as in the early blight test above. After the spray had dried, the plants were removed to the greenhouse and held for a period of 7–10 days. At the end of this time, the amount of rust was rated on a scale of 0–10, with 0=no control, and 10=complete control. Compounds having an 8–10 rating were passed to secondary testing.

The following results were obtained:

| Compound according to Example No. 7, Table I | ppm | Rating (0–10) |
|---|---|---|
| 8 | 500 | 9 |
| 9 | 500 | 8 | ii. Bean rust — Systemic application
Step 1:

Pinto bean plants were inoculated 24 hours prior to use as above, and the soil in the pot was treated with 20 ml of a formulation of a test chemical at 500 ppm. The plants were removed to the greenhouse and held for a period of 7–10 days at the end of which time the amount of rust was rated on the same scale as above. Compounds giving 8–10 ratings were passed on to the next step.

Step 2:

The same test as above was performed except that the minimum effective dose was determined in a dilution series of 100, 20 and 4 ppm. Plantvax was used as the commercial standard in this test. Plantvax is 2,3-dihydro-5-carboxanilido-6-methyl-1,4-oxathiin-dioxide.

The following results were obtained:

| Compound according to Example No. 7, Table I | ppm | Rating (0–10) |
|---|---|---|
| 8 | 500 | 10 |
| 9 | 500 | 8 |

4. Against *Fungi Imperfecti*
Step 1:
   i. Against species *Alternaria solani* (early blight) Foliar application with 1000 ppm of test chemical Tomato plants that were 4–5 weeks old were placed on a revolving turntable and sprayed with a formulation containing 1000 ppm of the test chemical. As soon as the spray deposit had dried, the plants were inoculated with a spore suspension of the early blight fungus (*Alternaria solani*) and placed in an incubation chamber for 24 hours, after which they were removed and held until lesions had developed. Visual ratings of control (0–10) were then made, and those compounds giving 85% or better control were passed to secondary testing.

Step 2:

The same test as was conducted in Step 1 was conducted in this step except that the concentration of the test chemical was lowered in the dilution series of 100, 20, and 4 ppm. Maneb (manganese ethylenebisdithiocarbamate) was used as a standard in this test. A typical Maneb dilution series gave the following results.

| ppm | % Control |
|---|---|
| 500 | 100 |
| 100 | 100 |
| 10 | 86 |
| 4 | 78 |
| 1 | 66 |

The following results were obtained for the test chemical.

| Compound according to Example No. 7, Table I | ppm | % Control |
|---|---|---|
| 8 | 500 | 90 |
| 12 | 500 | 80 |
| 11 | 500 | 100 | ii. Systemic application of *Alternaria solani*

The test compound was applied at a rate of 50 lbs. per acre to soil surrounding tomato plants which were growing in three and one-half inch pots. The plants were 4 weeks old. They were allowed to stand for 3 days in a greenhouse and then inoculated with spores of *Alternaria solani*. The number of spots observed were related to those observed in a standard or control plant and the percent control was based on the growth on the test plant contrasted with that of the standard or control plant.

The following results were obtained:

| Compound according to Example No. 7, Table I | lbs./acre | % Control |
|---|---|---|
| 8 | 25 | 70 | iii. Against species *Colletotrichum lagenarium* (Anthracnose)
Step 1.

Tomato plants that were 4–5 weeks old were placed on a revolving turntable and sprayed with a formulation containing 1000 ppm of the test chemical. As soon as the spray deposit had dried, the plants were inoculated with a spore suspension of Colletotrichum lagenarium fungus and placed in an incubation chamber for 24 hours, after which they were removed and held until lesions had developed. Visual ratings of control (0–10) were then made, and those compounds giving 85% or better control were passed to secondary testing.

Step 2.

The same procedure was followed as in Step 1 except that the concentration of the test chemical was lowered in the dilution series of 100, 20 and 4 ppm. Maneb (manganese ethylenebisdithiocarbamate) was used as the standard in this test and the typical results for the typical Maneb dilution series were as previously described.

The following results were obtained with the test chemicals:

| Compound according to Example No. 7, Table I | ppm | % Control |
| --- | --- | --- |
| 8 | 500 | 100 | iv. Against species *Cercospera beticola* (leaf spot)

The test procedure followed here was the same as that employed in the preceding test above (4) (iii) relating to the fungus Colletotrichum lagenarium.

The following results were obtained:

| Compound according to Example No. 7, Table I | ppm | % Control |
| --- | --- | --- |
| 8 | 500 | 99 |

5. Against the Schizomycetes fungi i. Against the species *Pseudomonas phaseolicola*

The test procedure was the same as that employed for Endothia parasitica as described above in (1) (iii) except that agar was used as a nutrient instead of potato dextrose.

The following results were obtained.

| Compound according to Example No. 7, Table I | ppm | % Control (0–100) |
| --- | --- | --- |
| 8 | 1000 | 100 |
| hexachlorophene | 1000 | 100 | ii. Against the species *Staphylococcus aureus*

The same test procedure was employed as was employed in the previous procedure of Pseudomonas phaseolicola (5)(i).

The following results were obtained:

| Compound according to Example No. 7, Table I | ppm | % Control |
| --- | --- | --- |
| 8 | 1000 | 100 |
| hexachlorophene | 1000 | 100 | iii. Against species *Escheria coli*

The same procedure was followed as in (5)(i) and (ii) above.

The following results were obtained:

| Compound according to Example No. 7, Table I | ppm | % Control |
| --- | --- | --- |
| 8 | 1000 | 100 |
| hexachlorophene | 1000 | 100 | iv. *Xanthomonas phaseoli*

The same procedure as previously employed in (5)(i), (ii), and (iii) was followed in this example.

The following results were obtained:

| Compound according to Example No. 7, Table I | ppm | % Control |
| --- | --- | --- |
| 8 | 1000 | 100 |
| hexachlorophene | 1000 | 100 |

A representative tabulation of bacteria and fungi controlled by the compounds of the present invention are shown below in Tables V and VI.

TABLE V

Fungal and Bacterial Diseases of Plants

| Fungi | Fungal Disease |
| --- | --- |
| Alternaria solani | Tomato Early Blight |
| Phytophthora infestans | Tomato Late Blight |
| Colletotrichum langenarium | Cucumber Anthracnose |
| Erysiphe polygoni | Bean Powdery Mildew |
| Erysiphe cichoracearum | Cucumber Powdery Mildew |
| Erysiphe cichoracearum | Cantaloupe Powdery Mildew |
| Peronospora parisitica | Broccoli Downy Mildew |
| Bremia lactucae | Lettuce Downy Mildew |
| Pseudoperonospora cubensis | Cucumber Downy Mildew |
| Uromyces phaseoli | Bean Rust |
| Venturia inaequalis | Apple Scab |
| Cercospora beticola | Sugarbeet Leaf Spot |
| Coccomyces hiemalis | Cherry Leaf Spot |
| Botrytis cinerea | — |
| Monilinia fructicola | — |
| Monilinia laxa | — |
| Sclerotinia sclerotiorum | — |
| Sclerotium rolfsii | — |
| Gilbertella persicaria | — |
| Alternaria tenuis | — |
| Cladosporium spp. | — |
| Fusarium oxysporum | — |
| Rhizoctonia solani | — |
| Aspergillus niger | — |
| Helminthosporium carbonum | — |
| Penicillium expansum | — |
| Penicillium digitatum | — |
| Phomopsis cinerascens | — |
| Ceratocystis fimbriata | — |
| Diplodia natalensis | — |
| Rhizopus stolonifer | — |
| Colletotrichum pisi | — |
| Verticillium albo-atrum | — |
| Phytophthora capsici | — |
| Botrytis cinerea | — |
| Monilinia fructicola | — |
| Penicillium digitatum | — |
| Phytophthora citrophora | — |
| Asperigillis niger | — |
| Rhizopus stolonifer | — |
| Glocosporium musarum | — |
| Thielaviopsis paradoxa | — |
| Diplodia natalensis | — |
| Phomopsis citri | — |
| Alternaria citri | — |

TABLE V -Continued

Fungal and Bacterial Diseases of Animals and Man

| Bacterial | Bacterial Disease |
|---|---|
| Xanthomonas prunii | Peach Spot |
| Erwinia amylovora | Fireblight |
| Xanthomonas vesicatoria | Tomato bacterial spot |
| Nectria galligena | — |

TABLE VI

Fungal and Bacterial Diseases of Animals and Man

| | |
|---|---|
| Animal pathogens: | Trichophyton interdigitale |
| | Microsporum gypseum |
| | Epidermophyton floccosum |
| | Candida albicans |
| | Aspergillis niger |
| | Penicillum expansum |
| | Endothia parasitica |
| Bacterial species: | Staphlococcus aureus |
| | E. coli |
| | Pseudomonas phaseolicola |
| | Xanthomonas phaseoli |
| | Bacillus mycoides |
| Fungal species: | Diplodia natalensis |
| | Phomopsis citri |
| | Geotrichum |
| | digitatum |

The following example illustrates a typical pesticidal composition or formulation of this invention. Parts are by weight.

EXAMPLE 11

A wettable powder concentrate that is diluted to the desired concentration by dispersing it in water has the following composition.

| | Parts |
|---|---|
| Active Ingredient | 50 |
| Solid Carrier (e.g. Attapulgite) | 43 |
| Dispersant (Monocalcium Salt of polymeric alkylaryl sulfonic acid) | 5 |
| Wetting agent (Sodium Alkyl Naphthalene Sulfate (Nekal BA-75')) | 2 |

It is to be noted in Example 8 that the experimental results are given in terms of either "Rating (0–10)" or "% Control", which are interchangeable. For example, each unit in the "Rating (0–10)" scale is equivalent to 10% in the "% Control" scale. As an illustration, ratings of 6, 8, 9, and 10 in the 0–10 scale are equivalent to 60%, 80%, 90% and 100% in the "% Control" scale. Thus, the experimental data set forth in Example 8 should be read in light of their interchangeability as expressed in the preceding three sentences.

Control of animal pathogens by the compounds of the present invention can be related to certain structure-activity relationships. Not intending to be bound or limited by any theory it is nevertheless believed that in the dithiobiuret series that when the total carbon content of $R_5 + R_6 + R_7 + R_8 + R_9 + R_{10}$ is less than 20, maximum biological activity is obtained. Enhancement of activity is also realized when one of the R groups ($R_5$–$R_{10}$) is a cycloalkyl moiety such as cyclohexyl. In addition maximum activity appears to be obtained when there are no NH linkages.

Relative to plant pathogens the same basic rules as above hold. However, selectivity is important in this class and phenyl substituted analogs appear to be less phytotoxic than the corresponding alkyl analogs.

EXAMPLE 12

To illustrate the utility of compounds of the present invention as animal health agents relative to fungi, bacteria, etc. the following compounds were tested with respect to this utility against the animal pathogens responsible for athlete's foot, thrush, ringworm, vaginitis, systemic mycoses, etc.

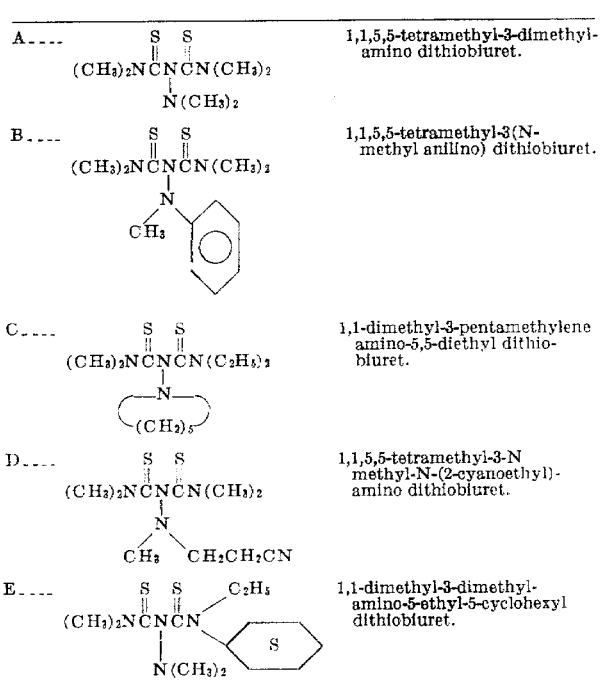

Procedure:

One hundred milligrams of each sample was dissolved in 10 mls. of acetone. One hundred milligrams of griseofulvin (McNeil Laboratories, Inc., McN-R-719, Lt. No. 4745), and one hundred milligrams of phenylmercuric acetate used as controls were also dissolved in 10 mls. of acetone. Malt extract agar was used as the culture medium. Petri plates were prepoured and kept refrigerated until needed. *Aspergillus niger, Candida albicans, Microsporum gypseum, Trichophyton interdigitale, Penicillium expansum, Epidermophyton floccosum,* and *Bacillus mycoides* were the organisms used to test the fungicidal activity of the samples. These organisms had been grown in Sabouraud dextrose broth. Sterile cotton swabs were used to streak each plate with the respective fungi.

A specific volume of each sample dissolved in acetone was delivered dropwise to a sterile ½ inch filter paper disc. The acetone was then allowed to evaporate. Identical concentrations of griseofulvin were delivered to the discs in the same manner. After the discs were thoroughly dry they were placed on the plates. Two discs of a specific concentration were placed on a plate along with two discs of an identical concentration of griseofulvin and two discs of an identical concentration of phenylmercuric acetate. The plates were incubated at room temperature about 20°–25°C., and observed every day for the apperance of growth and evidence of any zones of inhibition around the disc.

The data and results of Example 12 are included in Table VII

It should be understood from the foregoing that the above description is merely illustrative of the preferred embodiments and specific examples of the present invention and that in all of which embodiments and examples, variations, such as e.g. those previously described, can be made by those skilled in the art without departing from the spirit and purview thereof, the invention being defined by the following claims.

in which $R_{10}$ and $R_{11}$ are $C_1$–$C_3$ alkyl.

2. The method of claim 1 wherein the compound is 1,1,5,5-tetramethyl-3-dimethylamino dithiobiuret.

3. The method of claim 1 wherein the compound is 1,1,5,5-tetraethyl-3-dimethylamino dithiobiuret.

4. The method of claim 1 wherein the compound is 1,1,5,5-tetramethyl-3-diethylamino dithiobiuret.

TABLE VII

SUMMARY OF PRIMARY ANIMAL ANTIFUNGAL AND INDUSTRIAL ANTIMICROBIAL ACTIVITY

| | Animal Fungal Pathogens | | | | Leather and Textile Mildew | Paper Mill Slime | |
|---|---|---|---|---|---|---|---|
| | Trichophyton interdigitale | Microsporum gypseum | Epidermophyton floccosum | Candida albicans | Aspergillus niger | Penicillium expansum | Bacillus mycoides |
| Sample | Minimum Inhibitory Concentration in PPM | | | | | | |
| A | 20 | 20 | 40 | 310 | | | 40 |
| C | 2.5 | 10 | 5 | 2500 | | | 20 |
| B | 620 | 620 | 620 | 5000 | | | 620 |
| D | 80 | 160 | 80 | 5000 | | | 160 |
| E | 10 | 5 | 20 | 5000 | | | 10 |
| Phenylmercuric acetate | — | — | — | — | | | 1 |
| Griseofulvin | 4 | 16 | 16 | 5000 | | | — |
| Acetone-medium control | growth | growth | growth | growth | | | growth |
| | Minimum Inhibitory Concentration in mg. | | | | | | |
| A | 1 | 1 | | 5 | 5 | 5 | |
| C | 1 | 5 | | 5 | 5 | 5 | |
| B | 5 | 5 | | 5 | 5 | 10 | |
| D | 5 | 1 | | 5 | 5 | 15 | |
| E | 1 | 1 | | 5 | 5 | 5 | |
| Griseofulvin | 10 | 10 | | 15 | 15 | 15 | |

What is claimed is:

1. A method for killing fungi which comprises applying to said fungi a fungicidally effective amount of a compound of the formula

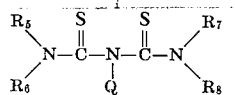

wherein each of $R_5$, $R_6$, $R_7$ and $R_8$ independently is $C_1$–$C_3$ alkyl; and wherein Q is selected from the group consisting of $C_1$–$C_3$ alkyl and 5. The method of claim 1 wherein the compound is 1,1-dimethyl-3-dimethylamino-5,5-diethyl dithiobiuret.

6. The method of claim 1 wherein the compound is 1,1,3,5,5-pentamethyl dithiobiuret.

7. The method of claim 1 wherein the compound is 1,1,5,5-tetra-n-propyl-3-methyl dithiobiuret.

8. The method of claim 1 wherein the compound is 1,1,3-trimethyl-5,5-di-n-propyl dithiobiuret.

9. The method of claim 1 wherein the compound is 1,1,5,5-tetramethyl-3-isopropyl dithiobiuret.

* * * * *